No. 788,569. PATENTED MAY 2, 1905.
H. H. WELSH, Jr.
MACHINE FOR APPLYING HOSE TO COUPLINGS.
APPLICATION FILED MAY 18, 1901.
2 SHEETS—SHEET 1.
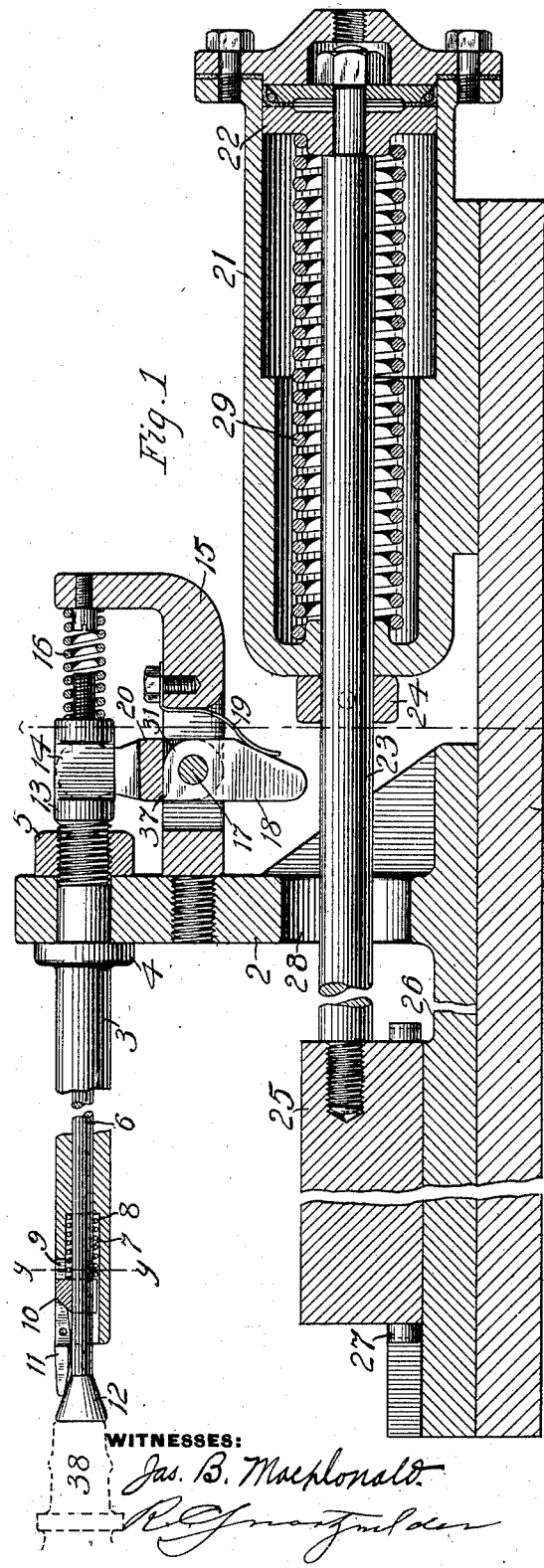
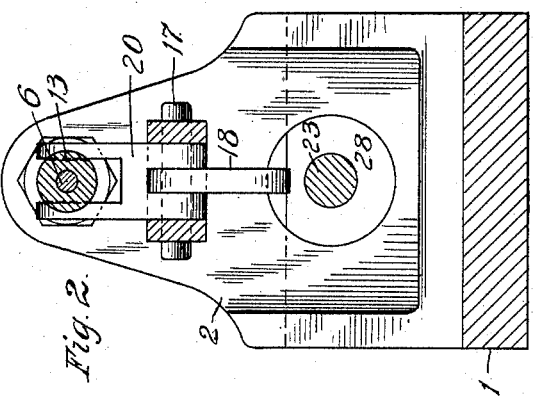
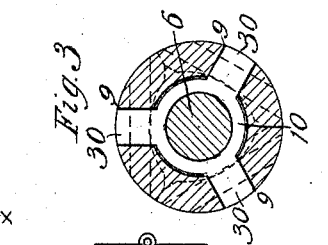
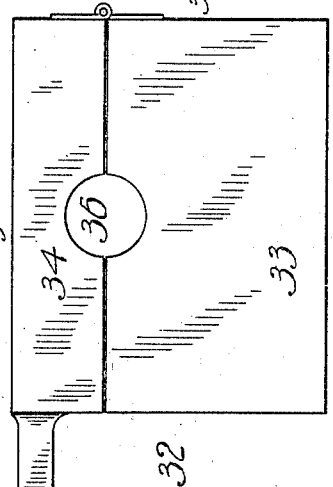
WITNESSES:
Jas. B. MacDonald
INVENTOR,
Harvey H. Welsh Jr.
by E. F. Wright
Att'y.

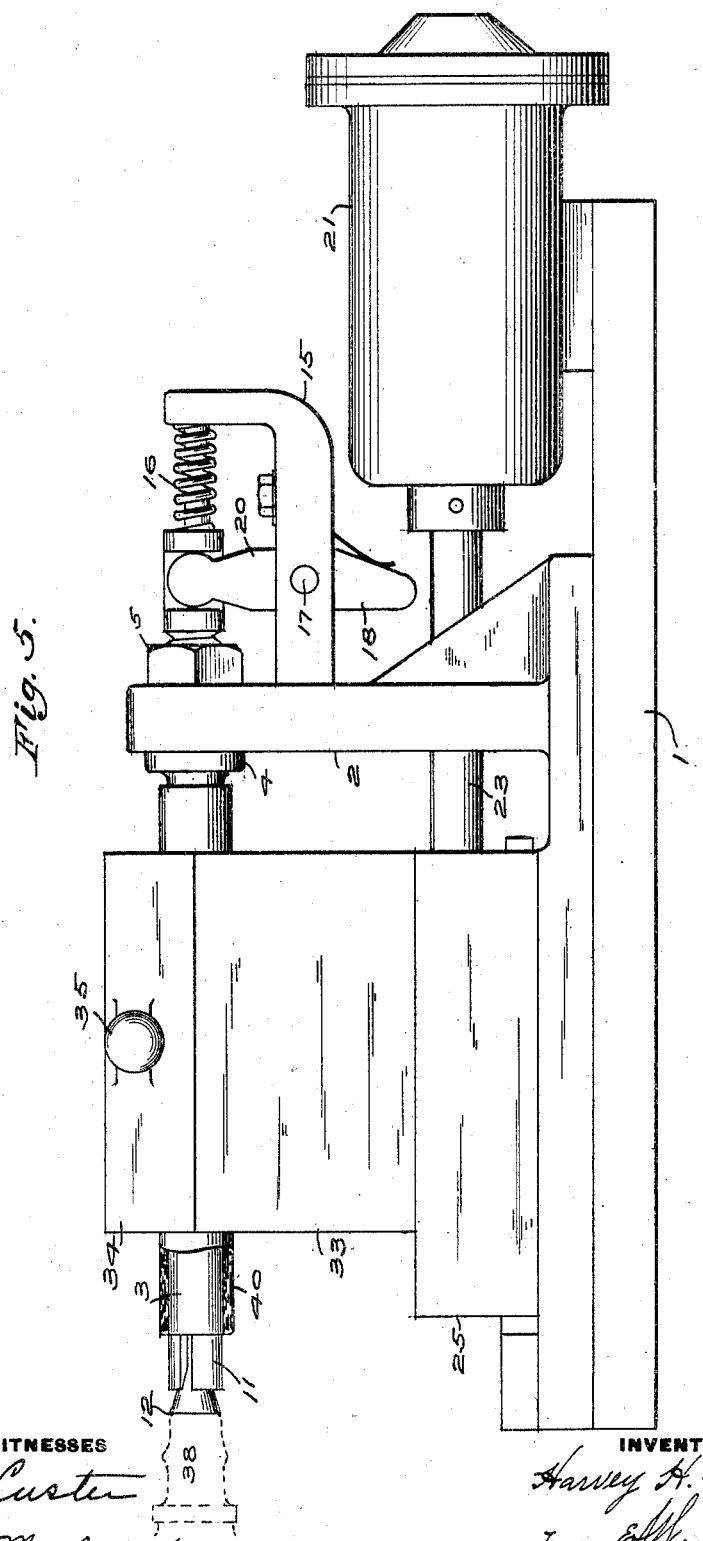

No. 788,569.

Patented May 2, 1905.

UNITED STATES PATENT OFFICE.

HARVEY H. WELSH, JR., OF WILMERDING, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

MACHINE FOR APPLYING HOSE TO COUPLINGS.

SPECIFICATION forming part of Letters Patent No. 788,569, dated May 2, 1905.

Application filed May 18, 1901. Serial No. 60,839.

*To all whom it may concern:*

Be it known that I, HARVEY H. WELSH, Jr., a citizen of the United States, residing in Wilmerding, county of Allegheny, State of Pennsylvania, have invented or discovered a certain new and useful Improvement in Machines for Applying Hose to Couplings, of which improvement the following is a specification.

My invention relates to machines for applying hose to couplings for air-brake or other apparatus, and has for its object to provide a device by means of which the end of the hose may be readily secured to the shank of the coupling. In order to secure a tight fit between the hose and the coupling, the interior diameter of the hose is usually somewhat less than the outer diameter of the shank of the coupling and the end of the hose will be slightly expanded when the hose and coupling are forced together.

My invention consists in an improved device for forcing the end of the hose and the shank of the coupling together and also in means for expanding the end of the hose as it is being forced onto the shank of the coupling; and my invention further consists in certain combinations and arrangement of parts, as hereinafter described and claimed.

In the accompanying drawings, Figure 1 is a longitudinal section of my improved machine, a part thereof being broken away. Fig. 2 is a transverse section taken on the line *x x* of Fig. 1. Fig. 3 is a transverse section, on a larger scale, taken on the line *y y* of Fig. 1. Fig. 4 is a view showing the clamp used for holding the hose in position, and Fig. 5 a side view showing the parts assembled in operating position.

The machine is provided with a base-plate 1, which may be secured on a bench or in any convenient position for working. On the base-plate 1 is mounted the standard 2, which carries at its upper end the projecting arm or spindle 3, upon which the hose is adapted to be placed. The spindle has a screw-threaded end which projects through a hole in the upper part of the standard, and it is also provided with a fixed collar 4 and nut 5, by means of which it is clamped in position. The spindle is hollow for its entire length, and through the bore extends the rod 6, which projects out at both ends of the spindle, the rear end being screw-threaded and the front end having the conical head or spreader 12. In the front end of the spindle 3 the bore through which the rod 6 extends is enlarged for a short distance, forming the cylindrical recess 7, in which is located the opening 8. Three radial slots 9 are formed in the end of the spindle, and in the end of each slot is pivoted a section of the expander 11. A collar 10 is located on the rod 6 in the recess 7 and is provided with radial extensions or beveled faced wings 30, which project into the slots 9 and are adapted to slide therein.

The radially-adjustable expander 11 is composed of three pivoted sections, the forward ends of which together form substantially a hollow cylindrical extension of the spindle 3 when in their contracted position, as shown in Fig. 1 and also indicated in dotted lines in Fig. 3. The rear part of each section of the expander consists of a narrow strip which extends into a slot 9 of the spindle and bears upon the inclined surface of radial projections or wings 30 of the collar 10. The outer ends of the cylindrical portions of the sections bear upon the conical surface of the head 12 of the rod 6, so that as the head is drawn inward the cylindrical parts of the sections will be spread apart and the collar 10 will be forced inward, compressing the spring 8. On the screw-threaded end of the rod 6 is adjustably mounted a threaded collar or nut 13, having slots 14 formed in opposite sides and adapted to receive the bifurcated ends of the lever 20, which is pivoted on the pin 17 in an opening of the bracket 15, which is secured to the upright standard 2. The lever 18 is also pivoted upon the pin 17 and has one square shoulder 37, which bears against the body of the lever 20, so that as the lever 18 swings to the left it engages lever 20 by shoulder 37 and turns it to the right—that is, both parts move together as one lever—but the rounded corner 31 of lever 18 allows it to turn freely toward the right without moving the upper lever 20. A spring 19 normally tends to keep the shoulder 37 of the lever 18 bearing against the body of the lever 20. A spring 16 is located between the nut 13 and an upward extension of the bracket 15 and tends to force the rod 6 with its head 12 outward until the nut 13 rests against the inner end of the spindle 3. The expander is then in its contracted position, as shown in Fig. 1, for the spring 8 forces the collar 10 with its beveled faced wings under the inner ends of the pivoted sections of the expander 11.

The power-cylinder 21 is mounted on the base-plate 1 and is provided with piston 22, piston-rod 23, and return-spring 29. The piston-rod 23 extends through an opening 28 in the standard 2 and is attached to the sliding table 25, which moves in guides 27 on the base 26 beneath the spindle 3. Collar 24 is secured on the piston-rod 23 and is so located that as it moves back and forth in its path it will engage with the lower end of the lever 18.

The clamp 32, as shown in Fig. 4, is composed of two parts or blocks 33 and 34, horizontally hinged together and provided with an opening 36 between them of the proper diameter for holding the hose. A handle 35 is attached to the upper block 34, by means of which the clamp may be opened and closed. The clamp 32 is to be secured in position on the sliding table 25, and the lower block 33 is of the proper thickness, so that when the hose is placed in position on the spindle 3 it may be securely clamped in the opening 36 between the two parts of the clamp. The length of the spindle is sufficient to accommodate the hose between the collar 4 and the expander 11. The spindle is of sufficiently small diameter to allow the hose to slide loosely thereon when carried by the hose-clamp 32. The shank of the coupling 38 is indicated in dotted lines in Fig. 1.

The operation is then as follows: The clamp 32 being open, the hose 40 is placed on the spindle 3 in such position that its outer end is located about at the end of the spindle. The spindle is of slightly smaller diameter than the interior of the hose to permit free movement thereof. The coupling 38 is then placed with its shank against the end of the head of the expander, as shown in Fig. 1, in position to have the hose forced thereon, the coupling being securely held in this position by any convenient means. The clamp is then closed upon the hose and air or other fluid under pressure admitted to the cylinder 21. As the piston 22 moves forward, compressing spring 29, the collar 24 engages the lower end of lever 18, turning it to the left and by means of shoulder 37 turning the upper lever 20 to the right. This carries nut 13 with rod 6 and head 12 to the right, compressing spring 16 and spreading open the sections of the expander 11. At the same time the hose is moved to the left on the spindle 3, since it is secured in the clamp 33, which is carried on the sliding table 25. The sections of the expander being spread apart, the end of the hose will be expanded as it passes over the expander 11 onto the shank of the coupling 38, and then the forcing of the hose onto the coupling is quickly and easily accomplished. When the end of the hose arrives at the flange of the coupling, the collar 24 has passed the lower trip-lever 18, releasing the spring 16, which then forces the nut 13, rod 6, and head 12 forward to the position shown in Fig. 1. The expander 11 is at the same time contracted by means of spring 8, as before described, and the hose with coupling attached may now be readily removed from the spindle by opening the clamp 32. The air or other fluid under pressure is then permitted to escape from the cylinder 21, and the spring 29 returns the piston 22 to its first position. As the nut 24 passes the lever 18 on its return stroke the lever 18 turns freely on the pivot 17 without moving upper lever 20, as the rounded corner 31 turns under the body of lever 20 without interfering therewith. Another hose may now be applied and the operation repeated.

What I claim as new, and desire to secure by Letters Patent, is—

1. In a machine for applying hose to couplings, the combination, of an adjustable expander for the end of the hose and means for forcing the hose and coupling together.

2. In a machine for applying hose to couplings, the combination, of an adjustable expander for the end of the hose, means for forcing the hose and coupling together and means for releasing the expander.

3. In a machine for applying hose to couplings, the combination, of an arm for carrying the hose, an expander for the end of the hose and means for forcing the hose onto the shank of the coupling.

4. In a machine for applying hose to couplings, the combination, of an arm for carrying the hose, an expander for the end of the hose, means for forcing the hose and coupling together and means for automatically releasing the expander.

5. In a machine for applying hose to couplings, the combination, of an arm for carrying the hose, an expander on said arm, means for spreading and releasing the expander and means for forcing the hose onto the coupling.

6. In a machine for applying hose to couplings, the combination, of an arm for carrying the hose, an expander, a spreader for the expander operated through the arm and means for forcing the hose and coupling together.

7. In a machine for applying hose to couplings, the combination, of an expander for the end of the hose and means for automatically spreading and releasing the expander as the hose and coupling are forced together.

8. In a machine for applying hose to couplings, the combination, of an arm or spindle for the hose, a clamp for securing the hose over the spindle, an expander on the spindle and means for moving the clamp whereby the end of the hose may be forced over the expander onto the coupling.

9. In a machine for applying hose to couplings, the combination, of a hollow arm or spindle for carrying the hose, an expander on the end of the arm, a rod extending through the hollow arm and having a head for opening the expander, means for operating the rod and means for forcing the hose onto the coupling.

10. In a machine for applying hose to couplings, the combination, of a hollow arm or spindle for the hose, an expander on the end of the arm, a rod extending through the arm for operating the expander, a lever for operating the rod and means for forcing the hose onto the coupling.

In testimony whereof I have hereunto set my hand.

H. H. WELSH, Jr.

Witnesses:
E. A. WRIGHT,
R. F. EMERY.